United States Patent [19]

Bludssus et al.

[11] Patent Number: 5,908,489
[45] Date of Patent: Jun. 1, 1999

[54] PROCESS FOR REMOVING ANTIMONY FROM HYDROFLUORIC ACID SOLUTIONS WHICH CONTAIN TA/NB

[75] Inventors: Walter Bludssus, Vienenburg; Karlheinz Reichert, Wolfenbüttel; Uwe Böhmke, Bad Harzburg, all of Germany

[73] Assignee: H.C. Starck GmbH & Co KG, Goslar, Germany

[21] Appl. No.: 08/846,335

[22] Filed: Apr. 30, 1997

[30] Foreign Application Priority Data

May 13, 1996 [DE] Germany .................. 196 19 228

[51] Int. Cl.⁶ .................................................. C21B 15/00
[52] U.S. Cl. ................................................................ 75/724
[58] Field of Search ................................ 75/724; 423/63, 423/62, 64, 65

[56] References Cited

U.S. PATENT DOCUMENTS

| | | | |
|---|---|---|---|
| 2,962,372 | 11/1960 | Foos et al. | 75/121 |
| 3,117,833 | 1/1964 | Pierret | 23/19 |
| 3,976,475 | 8/1976 | Markland | 75/724 |
| 4,518,570 | 5/1985 | Stewart et al. | |
| 5,194,232 | 3/1993 | Bludssus et al. | 423/65 |
| 5,209,910 | 5/1993 | Bludssus et al. | 423/63 |

*Primary Examiner*—Scott Kastler
*Attorney, Agent, or Firm*—Perkins, Smith & Cohen, LLP; Jerry Cohen

[57] ABSTRACT

The present invention relates to a process for removing antimony from hydrofluoric acid solutions which contain Ta/Nb and have an acidity of >18 N, by addition of a base metal reducing agent to the solution and heating at 40 to 60° C. for 4 to 8 hours.

14 Claims, No Drawings

PROCESS FOR REMOVING ANTIMONY FROM HYDROFLUORIC ACID SOLUTIONS WHICH CONTAIN TA/NB

BACKGROUND OF THE INVENTION

The present invention relates to a process for removing antimony from hydrofluoric acid solutions which contain Ta/Nb and have an acidity >18N.

When preparing Ta and Nb products by digestion with hydrofluoric acid and subsequent purification with MIBK, antimony (Sb) is an undesirable constituent because it cannot be removed from the process by this method. It is found mainly in the Ta product, but it is also found in unacceptable concentrations in $Nb_2O_5$. The actual extent of contamination depends on the concentration in the raw material.

$Ta_2O_5$ and $Nb_2O_5$ are being used to an increasing extent in high-tech fields such as optoelectronics, with the most stringent requirements placed on purity. That means that contamination with Sb has to be reduced to less than 5 ppm. However, the largest $Ta_2O_5$ raw material deposits in the World, in Australia, contain a large amount of antimony. Low-antimony raw materials are steadily running out or are no longer obtainable. It is therefore becoming increasingly important to provide a method for removing the Sb. Raw materials with up to 500 ppm of $Sb_2O_5$ are generally used in the fluoride process, wherein the antimony then appears at this order of magnitude in the resulting $Ta_2O_5$. It is reduced to a tenth of this in $Nb_2O_5$.

It is known that antimony in raw materials can be removed by pyrometallurgical processes, but these methods are not economically viable. Furthermore, it is known that Sb can be reduced in dilute mineral acids such as hydrochloric acid using base metals. This process is not known in the case of hydrofluoric acid, in particular at the concentrations which are conventionally produced during the digestion of Ta/Nb-containing raw materials. In this process, hydrofluoric acid concentrations of >18N are used. Under these conditions the antimony is retained in solution or redissolved. In trial examples, given below, relating to the solubility of Sb in HF-containing solutions, surprisingly, a solubility for metallic antimony was found which conflicts with indications of the known prior art.

Furthermore, the working-up of antimony-containing Ta/Nb ores is rendered difficult because antimony cannot be brought into solution by using mineral acids, with the exception of hydrofluoric acid. Thus separation via a chemical route, by means of fractionated dissolution using, different mineral acids, is not possible. The object of the invention is, therefore, to provide a process which enables antimony to be removed from strong hydrofluoric acid solutions before extraction with MIBK.

SUMMARY OF THE INVENTION

Surprisingly, it has now been found that Sb can be completely removed from hydrofluoric acid solutions if the reduction is performed in specific time and temperature corridors.

This invention provides a process for removing, antimony from hydrofluoric acid solutions of Ta/Nb with an acidity of >18N, wherein the antimony is separated using base metals like Fe, Zn, Al, Mn, Ti, Mu, Sn and process limits of a temperature of 60° C. and a reaction time of 20 hours are not exceeded.

The metals iron, zinc and aluminium are particularly suitable as reducing agent.

Iron is particularly preferred as a reducing agent.

DETAILED DESCRIPTION OF PREFERRED EMBODIMENTS

The use of iron as a reducing, agent is advantageous because the antimony is deposited on the surface of the iron under the conditions according to the invention and thus inhibits any marked evolution or hydrogen, whereas zinc dissolves with the vigorous evolution of hydrogen. An excess of Fe, Zn or Al powder is preferably added to a solids-free solution from the raw materials digestion procedure in Ta/Nb production. The temperature of the solution should not exceed 60° C. since, under these conditions, Sb which has already been produced goes back into solution. Lowering of the reaction temperature to room temperature, on the other hand, decreases the rate of reaction to such an extent that deposition is incomplete and thus the process becomes uneconomical. Table 1, given below, shows the effect of reaction times, temperatures and reducing, agent on the concentration of antimony in the resulting hydrofluoric acid solution. 100 ml of antimony-containing hydrofluoric acid were treated with Zn and iron powder at a temperature of 25° C. The hydrofluoric acid solution was doped with $Sb_2O_3$.

Reducing times of 4 to 5 hours are particularly preferred.

TABLE 1

| Concentration of Sb in the initial solution [mg Sb/l] | Amount of Fe [g] | Amount of Zn [g] | Reaction time [h] | Concentration of Sb in the final solution [mg Sb/l] |
|---|---|---|---|---|
| 5200 |  | 2 | 1 | 20 |
| 5200 |  | 2 | 1 | 30 |
| 5200 |  | 1 | 1 | 1200 |
| 5200 |  | 0.5 | 1 | 3500 |
| 5200 | 3 |  | 2 | 180 |
| 5200 | 2 |  | 2 | 310 |
| 5200 | 2 |  | 20 | 640 |
| 5200 | 1 |  | 2 | 1900 |
| 5200 | 0.5 |  | 2 | 4200 |

From these examples, it is clear that the antimony content of the solutions can be drastically lowered. In this case, the best results are produced when at least a five-fold excess of zinc or a 7.5-fold excess of iron, with respect to the Sb content of the solution, is used. At the same time, it can be seen that there is a tendency for the antimony to go back into solution at longer reaction times (20 hours).

The data given above show the reaction behavior of Sb at room temperature. Now, these conditions are not realistic during commercial production of Ta/Nb. For technical and economic reasons, the solutions are generally processed at higher temperatures, preferably at temperatures of 40 to 60° C. Also, the actual state of antimony in ores is not comparable to the doped $Sb_2O_3$, which obviously has a different chemical behavior from the modification present in Ta/Nb ores. In the following example shown in Table 2, a solution like the ones normally produced during production was used, i.e. the antimony arises from Ta/Nb ores like those which are available on the World market. A raw materials solution was prepared from which an 80 mg Sb per liter concentration was obtained in hydrofluoric acid solution.

The amounts of Fe and/or Zn base metal shown in Table 2 were added as fine particles in a five-fold excess of zinc or 7.5-fold excess of iron, as mentioned above, relative to stoichiometry for reducing all antimony of the solution. The antimony was physically removed by removal of the base metal to which precipitated antimony metal had adhered.

The desired base metal concentration can, in practice, be obtained by a distinct addition and/or by adjustment of an already present concentration of such base metal in the raw material.

TABLE 2

| Concentration of Sb in the initial solution [mg Sb/l] | Amount of Fe [g] | Amount of Zn [g] | Reaction time [h]/Temp. °C. | Concentration of Sb in the final solution [mg Sb/l] |
|---|---|---|---|---|
| 80 | 2 |  | 2   25 | 60 |
| 80 | 2 |  | 2   25 | 80 |
| 80 | 2 | 0.5 | 2   25 | <20 |
| 80 |  | 2 | 2   25 | <20 |
| 80 | 2 |  | 4   25 | 45 |
| 80 | 2 |  | 4   25 | 40 |
| 80 | 2 |  | 8   25 | 45 |
| 80 | 2 |  | 16  25 | <20 |
| 80 | 2 |  | 16  25 | <20 |
| 80 | 2 |  | 2   40 | 30 |
| 80 | 2 |  | 4   40 | <20 |
| 80 | 2 |  | 2   60 | 75 |

While the best results are obtained with zinc as the reducing agent, specific corridors have to be observed for iron. The temperature range from 40 to 50° C. at reaction times of 4 to 10 hours has proved particularly effective for iron. Under these conditions it is possible to remove antimony completely by filtering the slurry of iron particles coated with antimony from the solution.

A further increase in reaction temperature to 60° C. and above leads to complete dissolution of the iron powder and also of the already reduced antimony. An additional problem in this case is the formation of iron fluoride which leads to considerable problems during production, due to the formation of crystals.

Solutions with antimony concentrations of <5 mg/l yield a Sb-free product after passage through the standard Ta/Nb production route of MIBK extraction as described, for example, in the following U.S. Pat. Nos.: 2,962,372, 3,117,833.

In addition to eliminating antimony, it is also possible to remove arsenic from the solutions, because it exhibits similar behavior, due to its chemical relationship to antimony. In contrast to antimony, arsenic is always completely removed under the reaction conditions described above, i.e. no back reactions were observed. This fact indicates that arsenic forms its hydride more readily than does antimony and thus is discharged.

The following trial examples, which were performed under operating conditions shown below, clearly demonstrate the effect of temperature, reaction time and amount of iron.

TABLE 3

| Concentration of impurities in the initial solution | | Amount of Fe in solution | Reaction time | | Concentration of impurities in the final solution | |
|---|---|---|---|---|---|---|
| As [mg/l] | Sb [mg/l] | [g/l] | [h] | Temp. °C. | As [mg/l] | Sb [mg/l] |
| 8 | 38 | 20 | 1.5 | 42 | 5 | 21 |
| 8 | 38 | 20 | 1.5 | 42 | 6 | 25 |
| 8 | 38 | 20 | 1.5 | 50 | 5 | 25 |
| 8 | 38 | 20 | 1.5 | 45 | 7 | 23 |
| 8 | 38 | 20 | 3.0 | 45 | <5 | 17 |
| 8 | 38 | 20 | 3.0 | 45 | <5 | 16 |
| 8 | 18 | 13 | 3.5 | 45 | <5 | <5 |
| 8 | 18 | 13 | 3.5 | 45 | <5 | <5 |
| 19 | 18 | 13 | 3.0 | 45 | <5 | <5 |
| 19 | 18 | 13 | 3.0 | 45 | <5 | <5 |
| 15 | 60 | 13 | 3.0 | 45 | <5 | 25 |
| 15 | 60 | 13 | 3.0 | 45 | <5 | 23 |
| 15 | 60 | 13 | 3.0 | 45 | <5 | 26 |
| 15 | 60 | 13 | 3.0 | 45 | <5 | 29 |
| 41 | 50 | 20 | 5.0 | 45 | <5 | <5 |
| 41 | 50 | 20 | 5.0 | 45 | <5 | <5 |
| 41 | 50 | 20 | 5.0 | 45 | <5 | <5 |
| 21 | 60 | 20 | 5.0 | 45 | <5 | <5 |
| 21 | 60 | 20 | 5.0 | 45 | <5 | <5 |
| 21 | 60 | 20 | 5.0 | 45 | <5 | <5 |

TRAIL EXAMPLES

Tests on the solubility of metallic antimony in hydrofluoric acid solutions were made.

1. 10 g of metallic antimony powder was treated with 100 ml of HF 40% (22N) for 2 hours with stirring. At 30° C. and below, 2 g of Sb dissolved. At 40° C., the amount dissolved rose to 2.2 g per liter.

2. 10 g of metallic antimony powder was treated with 100 ml of a typical Ta/Nb-containing filtrate from Ta/Nb production (acidity 25.5N) for 2 hours at 40° C. with stirring; whereby 4.5 g of antimony dissolved per liter.

We claim:

1. A process for removing antimony from a hydrofluoric acid (HF) solution which contains tantalum and/or niobium and has an acidity of >18N, characterized in that antimony is separated providing one or more metals selected from the group consisting of Fe, Zn, Al, Mn, Mg and Sn within the solution and that operating limits of a temperature of 60° C. and a reaction time of 20 hours are not exceeded, the antimony being present as a reducible compound thereof in the HF solution and the base metal reducing such compound to free the antimony as a physically removable solid.

2. A process according to claim 1, characterized in that the base metals are selected from the group consisting of iron, zinc and aluminium.

3. A process according to claim 2, wherein iron is used.

4. A process according to claims 1 or 2, characterized in that temperatures of 40 to 60° C. are maintained.

5. A process according to claim 4, characterized in that the reaction time is 4 to 8 hours.

6. A process according to either of claims 1 or 2, characterized in that the reaction time is 4 to 8 hours.

7. A process according to claim 6, characterized in that the reduced antimony metal is filtered out of the HF.

8. A process according to either of claims 1 or 2, characterized in that the reduced antimony metal is filtered out of the HF.

9. A process according to either of claims 1 or 2, wherein iron provided in powder form and further characterized in that the iron powder has a particle size of <200 microns.

10. In the process of producing Nb and/or Ta by dissolving a solid source of mixed oxides of Nb and/or Ta and impurity metals, including Sb as a reducible compound thereof, in HF and subjecting the solution so formed to liquid-liquid extraction process, the improvement comprising:

provididing a reducing metal relative to Sb, to the process solution prior to the extraction step of the process, in sufficient quantities to liberate substantially all the Sb from said reducible compounds thereof as a removable form of Sb and then removing the Sb, maintaining said solution with the provided metal therein at 40–60° C. for 4–8 hours to effect such reduction.

11. A process according to claim 10, characterized in that the provided metal is selected from the group consisting of iron, zinc and aluminium.

12. A process according to claim 11, wherein iron is provided.

13. A process according to claim 11, wherein iron is provided as an added powder and further characterized in that the iron powder has a particle size of <200 microns.

14. A process according to any of claims 1–3 or 10–12 wherein the providing comprises addition of the provided metal.

* * * * *